United States Patent
Cheng et al.

(10) Patent No.: US 10,119,545 B2
(45) Date of Patent: Nov. 6, 2018

(54) 3-D SENSORLESS CONVERSION METHOD AND APPARATUS FOR PUMP DIFFERENTIAL PRESSURE AND FLOW

(71) Applicant: Fluid Handling LLC., Morton Grove, IL (US)

(72) Inventors: Andrew A. Cheng, Wilmette, IL (US); Graham A. Scott, Prospect Heights, IL (US); James J. Gu, Buffalo Grove, IL (US)

(73) Assignee: Fluid Handling LLC, Morton Grove, IL (US)

( * ) Notice: Subject to any disclaimer, the term of this patent is extended or adjusted under 35 U.S.C. 154(b) by 823 days.

(21) Appl. No.: 14/091,795

(22) Filed: Nov. 27, 2013

(65) Prior Publication Data
US 2014/0249682 A1 Sep. 4, 2014

Related U.S. Application Data

(60) Provisional application No. 61/771,375, filed on Mar. 1, 2013.

(51) Int. Cl.
*G05D 7/06* (2006.01)
*F04D 15/00* (2006.01)

(52) U.S. Cl.
CPC .... *F04D 15/0088* (2013.01); *F05D 2270/304* (2013.01); *F05D 2270/335* (2013.01)

(58) Field of Classification Search
CPC ..................................................... F04D 27/001
See application file for complete search history.

(56) References Cited

U.S. PATENT DOCUMENTS

| 4,490,094 A | 12/1984 | Gibbs |
| 5,651,264 A | 7/1997 | Lo et al. |

(Continued)

FOREIGN PATENT DOCUMENTS

| EP | 1761306 | 3/2007 |
| RU | 2430401 A1 | 9/2011 |

(Continued)

OTHER PUBLICATIONS

Makoto Yoshizawa, Tsutomu Sato, Akira Tanaka, Ken-Ichi Abe, Hiroshi Takeda, Tomoyuki Yambe, Shin-Ichi Nitta, and Yukihiko Nosé, "Sensorless Estimation of Pressure Head and Flow of a Continuous Flow Artificial Heart Based on Input Power and Rotational Speed", 2002, ASAIO Journal, 443-448.*

(Continued)

*Primary Examiner* — Kenneth M Lo
*Assistant Examiner* — David J Wynne
(74) *Attorney, Agent, or Firm* — Ware, Fressola, Maguire & Barber LLP

(57) ABSTRACT

The present invention provides apparatus featuring a signal processor or processing module that may be configured at least to: receive signaling containing information about calibrated motor speed and power data for a hydronic pumping system; and determine system pumping flow rate and pressure associated with an equivalent hydronic system characteristic variable, based at least partly on the signaling received. The signal processor or processing module may be configured to provide corresponding signaling containing information about the system pumping flow rate and pressure determined. The corresponding signaling may contain information used to control the hydronic pumping system.

24 Claims, 9 Drawing Sheets

(56) References Cited

U.S. PATENT DOCUMENTS

| | | | |
|---|---|---|---|
| 6,142,228 | A | 11/2000 | Jogi et al. |
| 6,324,490 | B1 | 11/2001 | Johansson et al. |
| 7,036,559 | B2 † | 5/2006 | Stanimirovic |
| 7,261,167 | B2 | 8/2007 | Goldman et al. |
| 7,341,201 | B2 † | 3/2008 | Stanimirovic |
| 7,396,327 | B2 | 7/2008 | Morello |
| 7,558,699 | B2 | 7/2009 | Beck et al. |
| 7,630,580 | B1 | 12/2009 | Repenning |
| 7,845,913 | B2 | 12/2010 | Stiles, Jr. et al. |
| 7,896,105 | B2 | 3/2011 | Dupriest |
| 8,065,110 | B2 | 11/2011 | Golinveaux et al. |
| 8,121,971 | B2 | 2/2012 | Edwards et al. |
| 8,180,593 | B2 | 5/2012 | Anderson et al. |
| 8,235,776 | B2 † | 8/2012 | Stanimirovic |
| 8,235,777 | B2 | 8/2012 | Stanimirovic |
| 2003/0039556 | A1* | 2/2003 | Sacher ............... G05D 7/0676 417/212 |
| 2004/0062658 | A1* | 4/2004 | Beck ................... E21B 43/126 417/42 |
| 2004/0064292 | A1 | 4/2004 | Beck |
| 2007/0154320 | A1 | 7/2007 | Stiles, Jr. et al. |
| 2007/0212210 | A1* | 9/2007 | Kernan ............... F04D 27/001 415/1 |
| 2008/0288115 | A1 | 11/2008 | Rusnak et al. |
| 2011/0071688 | A1 | 3/2011 | Lovell et al. |
| 2012/0029707 | A1 | 2/2012 | Dazai et al. |
| 2012/0251340 | A1 | 10/2012 | Ahonen et al. |
| 2013/0048114 | A1 | 2/2013 | Rothman et al. |

FOREIGN PATENT DOCUMENTS

| | | |
|---|---|---|
| WO | 2005115539 | 12/2005 |
| WO | 2013025826 | 2/2013 |
| WO | 2013090907 | 6/2013 |
| WO | 2014089693 A1 | 6/2014 |

OTHER PUBLICATIONS

English language Abstract of RU2430401C2.(Also U.S. Publication 20110071688A1).

\* cited by examiner
† cited by third party

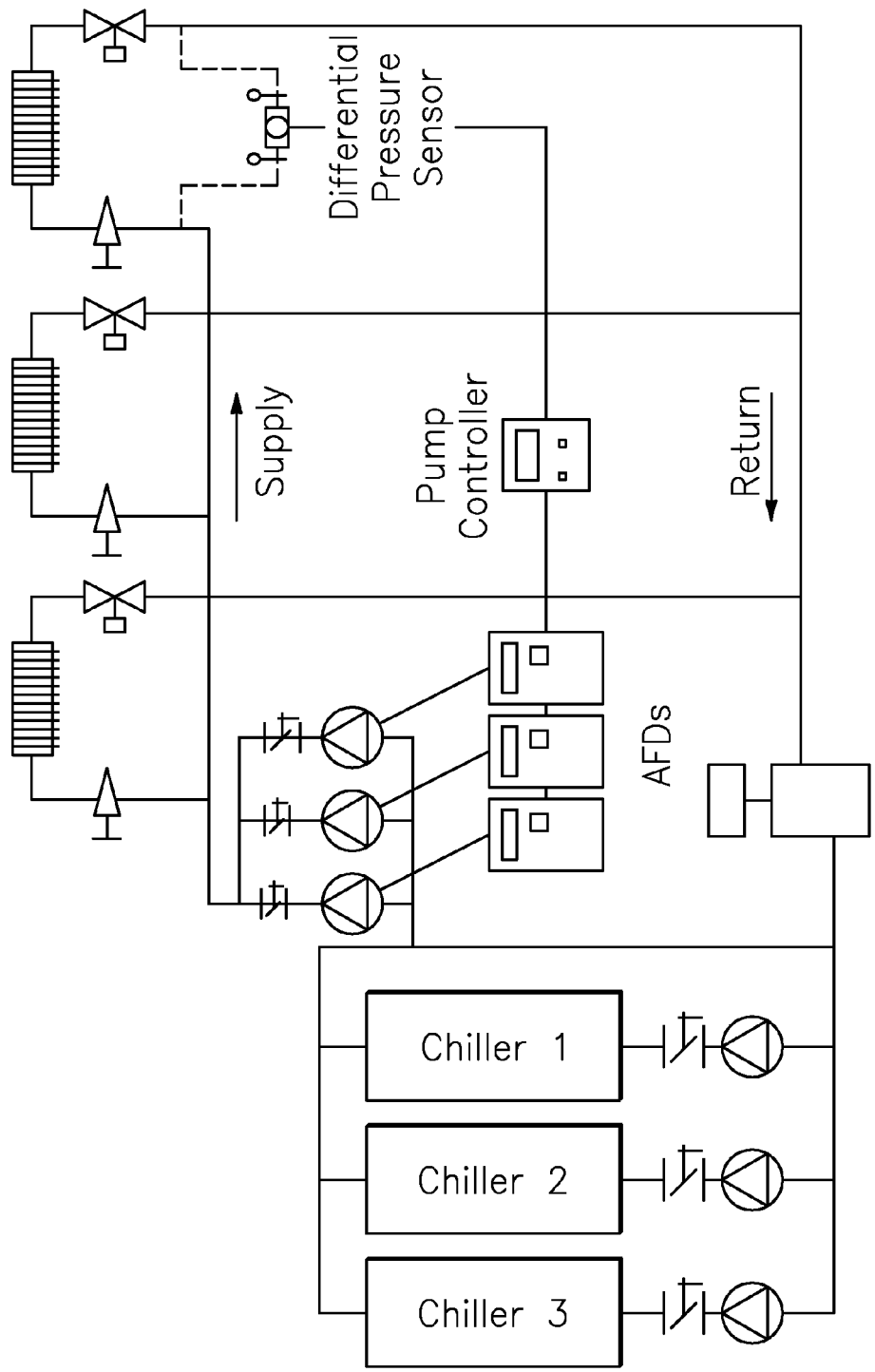
FIG. 1a: A secondary variable speed pump control hydronic heating or cooling system (PRIOR ART)

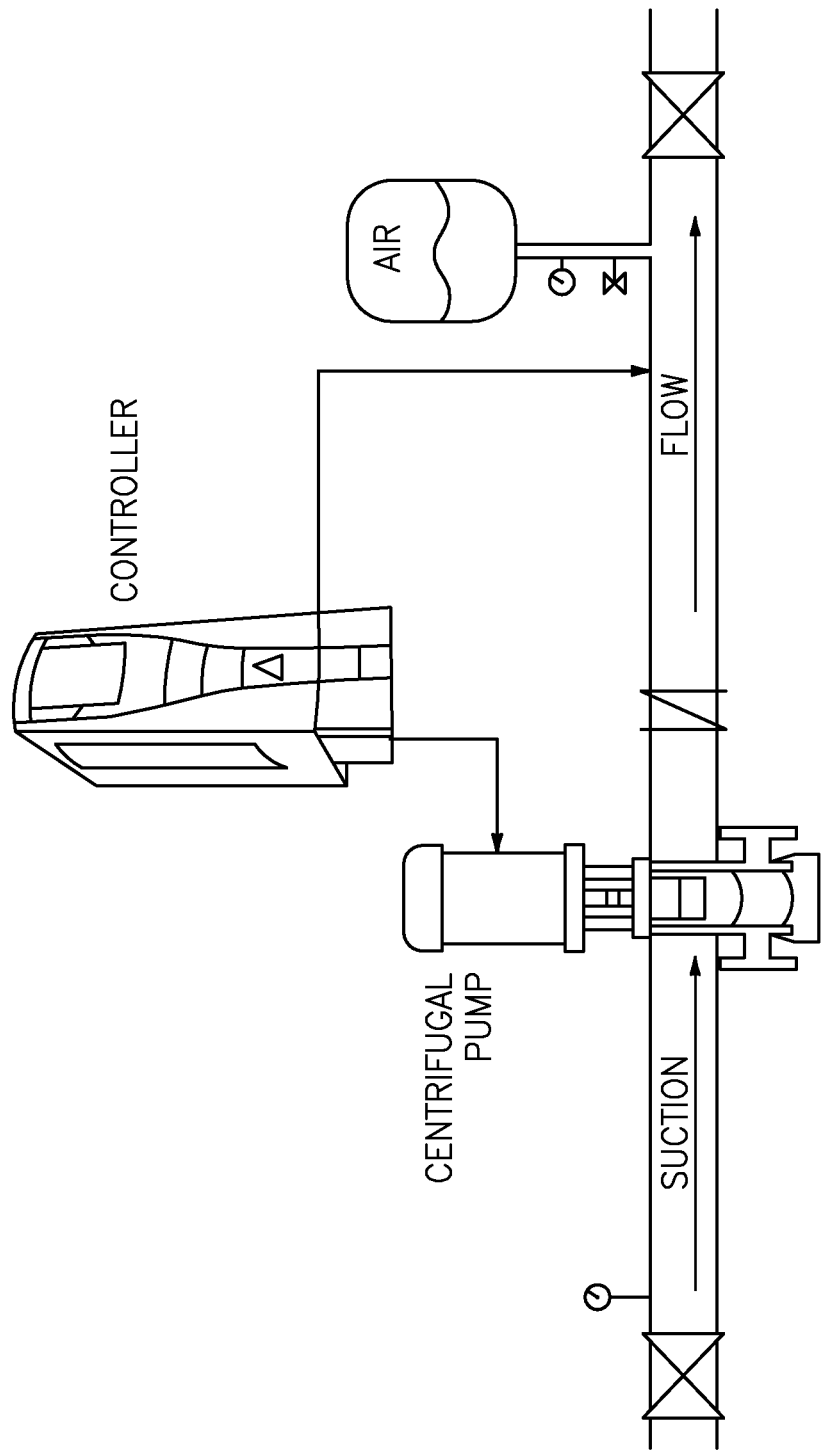
FIG. 1b: A water booster pumping system (PRIOR ART)

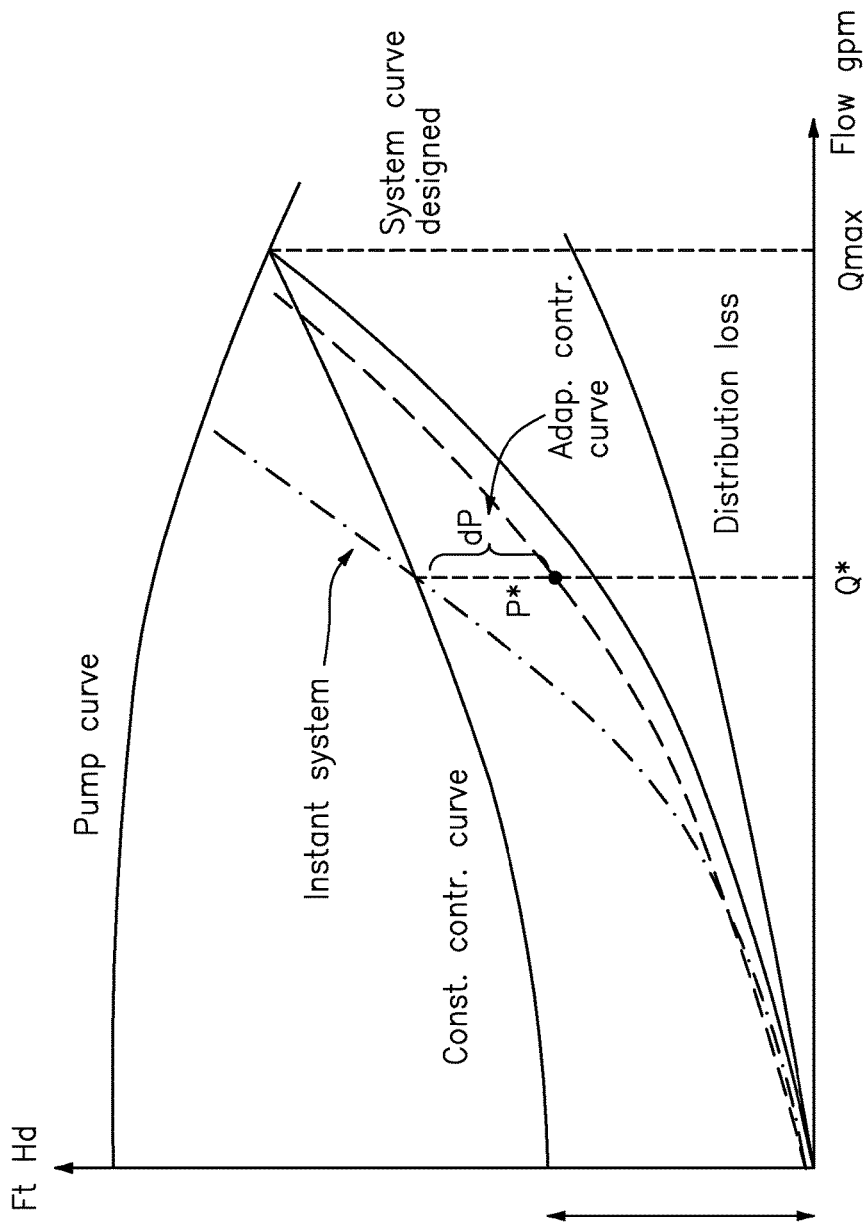
*FIG. 1c*: An adaptive control approach in which the hydronic power saved
(PRIOR ART) = dP* Q* at a flow rate of Q*.

Apparatus 10

A signal processor 12 configured to:

receive signaling containing information about calibrated motor speed and power data for a a pumping hydronic system, determine system pumping flow rate and pressure associated with an equivalent hydronic system characteristic variable using a 3-dimensional sensorless model or algorithm, based at least partly on the signaling received, and/or provide a control signal containing information to control the pump based at least partly on the system pumping flow rate and pressure determined.

Other signal processor circuits or components 14 that do not form part of the underlying invention, e.g., input/output modules, one or more memory modules, data, address and control busing architecture, etc.

FIG. 2

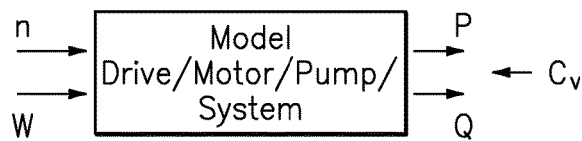
FIG. 3: Conversion of the system pressure and flow rate and motor electrical power and speed for a pumping hydronic system.
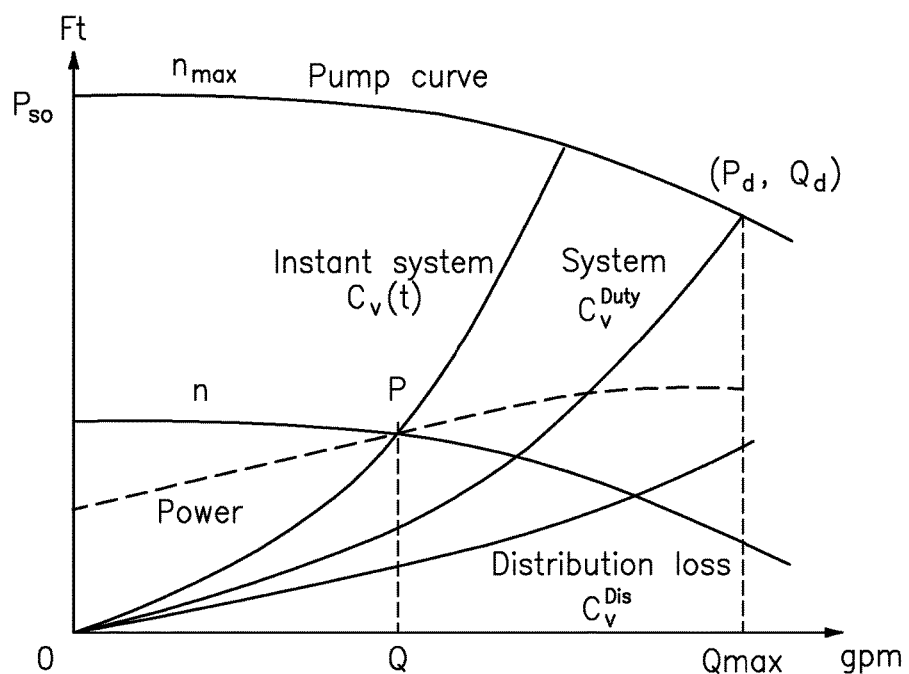
FIG. 4: Pump differential pressure curve at a given speed balanced with the system characteristics curve at an equilibrium point.

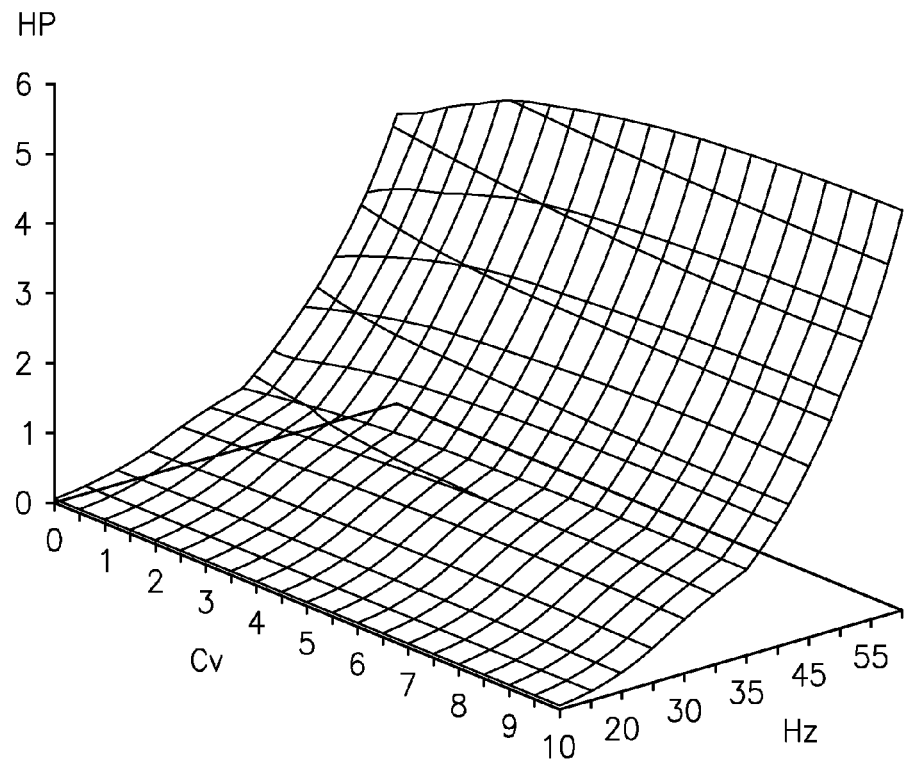
FIG. 5a: 3D discrete distribution functions of system flow, pump differential pressure, motor power with respect to motor speed and equivalent system characteristics, respectively.

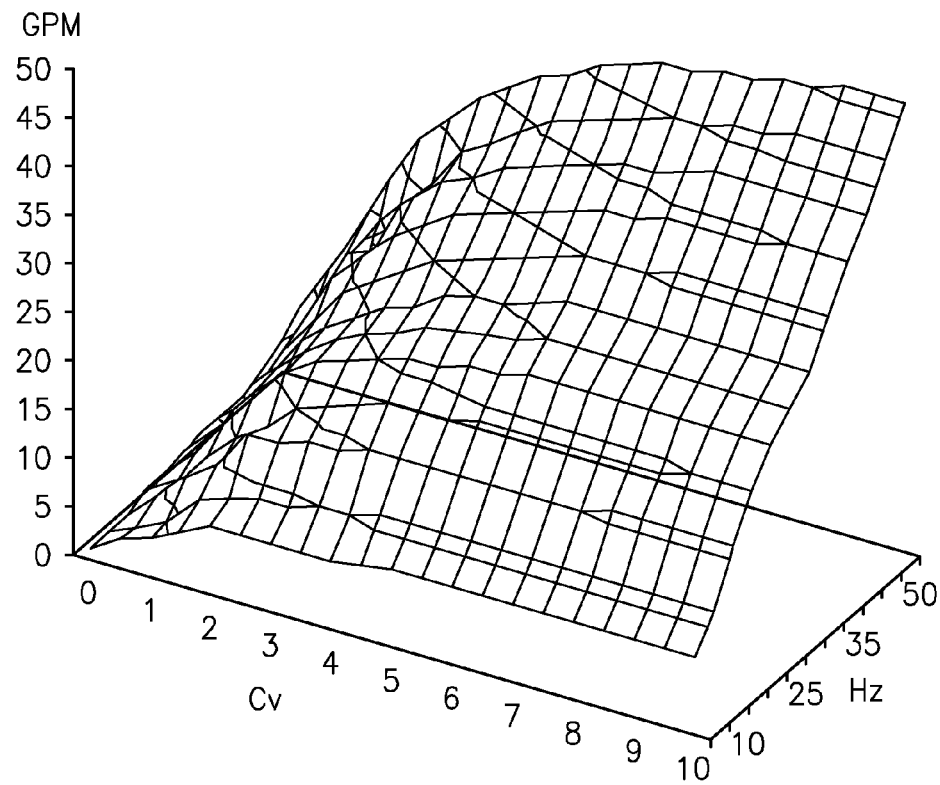
FIG. 5b: 3D discrete distribution functions of system flow, pump differential pressure, motor power with respect to motor speed and equivalent system characteristics, respectively.

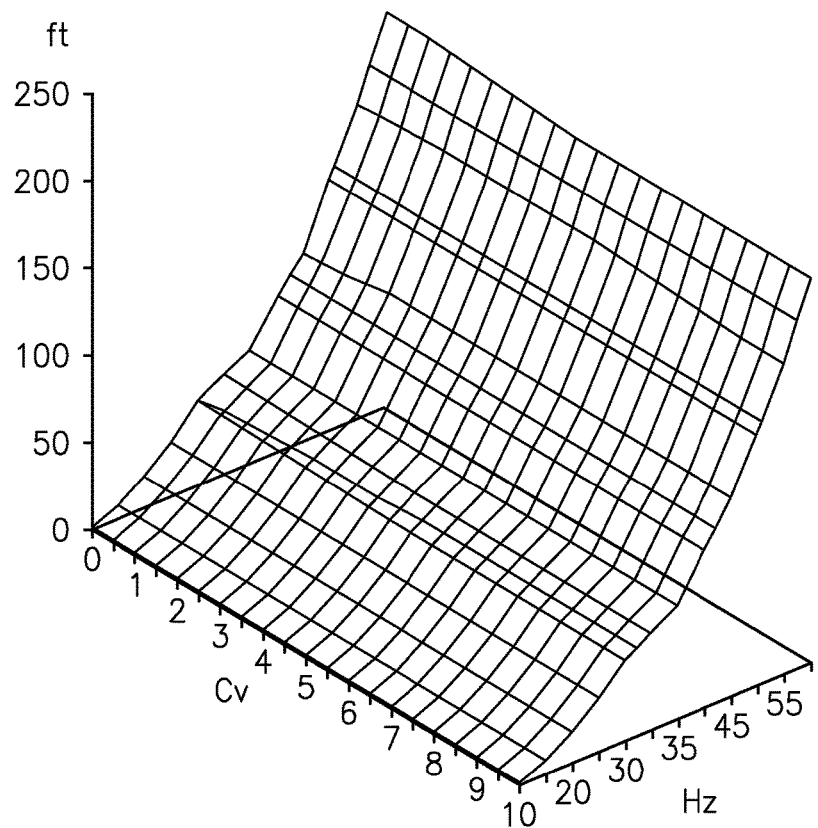
FIG. 5c: 3D discrete distribution functions of system flow, pump differential pressure, motor power with respect to motor speed and equivalent system characteristics, respectively.

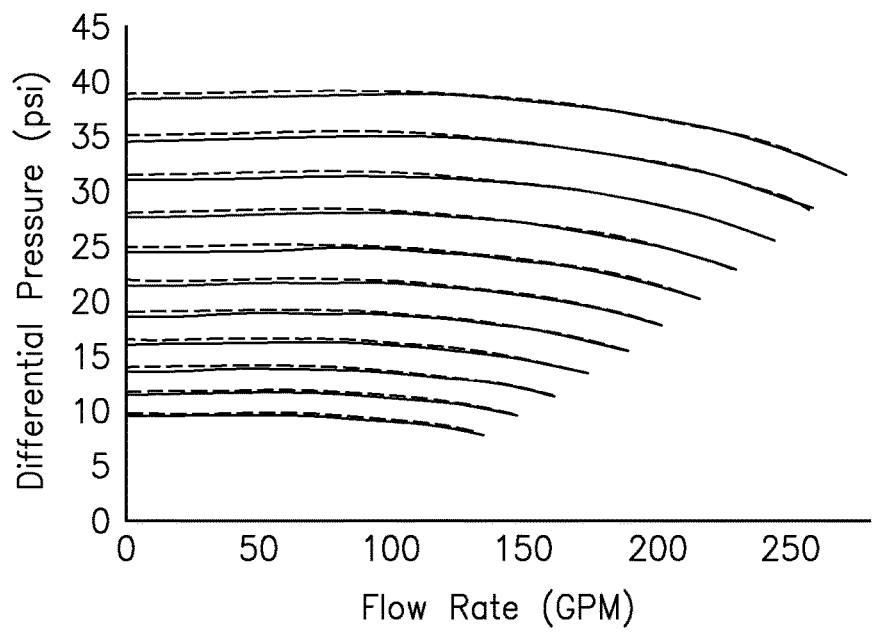
*FIG. 6*: Comparison of the pump differential pressure and flowrate readouts from the converter (dashed lines) and sensors (solid lines) with respect to motor speed.

3-D SENSORLESS CONVERSION METHOD AND APPARATUS FOR PUMP DIFFERENTIAL PRESSURE AND FLOW

CROSS REFERENCE TO RELATED APPLICATION

This application claims benefit to provisional patent application No. 61/771,375, filed 1 Mar. 2013, which is hereby incorporated by reference in its entirety.

This application is also related to the applications, as follows:
- U.S. application Ser. No. 12/982,289, filed 30 Dec. 2010, entitled "Method and apparatus for pump control using varying equivalent system characteristic curve, AKA an adaptive control curve;"
- U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011;
- U.S. provisional application No. 61/803,258, filed 19 Mar. 2013, entitled "Mixed theoretical and discrete sensorless converter for pump differential pressure and flow monitoring;"
- U.S. provisional application No. 61/858,237, filed 25 Jul. 2013, entitled "Sensorless adaptive pump control with self-calibration apparatus for hydronic pumping system;"

which are all assigned to the assignee of the instant patent application, and all incorporated by reference in their entirety.

The present invention builds on the family of technologies disclosed in the aforementioned related applications.

BACKGROUND OF THE INVENTION

1. Field of the Invention

The present invention relates to a technique for controlling the operation of a pump; and more particularly, the present invention relates to a method and apparatus for controlling a pump, e.g., for domestic and commercial heating or cooling water systems.

2. Brief Description of Related Art

By way of example, FIG. 1(a) shows a secondary variable speed pump control hydronic heating and cooling system that is known in the art, and FIG. 1(b) shows a water booster pumping system that is also known in the art. Recently, issues regarding energy saving and environmental protection in such pumping systems have been addressed dramatically. Increasing more attention is being paid to hydronic pump control applications, including pump controls for domestic and commercial heating and cooling water pumping or circulating systems, water booster pumping systems, and so forth, like those shown in FIGS. 1(a) and (b) with their characteristics that may be dynamic and unknown in nature. To reduce energy consumption and operation costs, some known adaptive control approaches have been proposed.

Furthermore, the aforementioned U.S. patent application Ser. No. 12/982,286, filed 30 Dec. 2010 discloses an adaptive control scheme for hydronic heating and cooling pumping systems as well as for water booster pumping systems, consistent with that shown in FIGS. 1(a) and (b) schematically. In FIG. 1(b), the hydronic pumping system includes a controller and a pump arranged in relation to a process pipe having check valves configured therein. In operation, the pump responds to control signaling from the controller, and pumps the a flow through the process pipe. FIG. 1(c) shows a graph having various functions plotted using known system curve equations, e.g., including a pump curve, an instant system curve, a constant control curve, an equivalent system curve (as designed), an adaptive control curve and a distribution loss curve. A pressure set point, P*, with respect to a flow rate requested, Q*, can be calculated and/or determined from the equation of $P^*(t) = (Q^*(t)/\overline{C}_v^a(t))^2 + b$, where the adaptive control curve, $\overline{C}_v^a(t)$, may be obtained from the flow equation together with a moving average filter. With this adaptive approach, the adaptive control curve to obtain the pressure set point is much closer to the equivalent system curve which represents the minimum pressure needed to maintain the flow rate requested, consistent with that shown in FIG. 1(c). Because of this, pumping system operation energy may be saved using this adaptive approach.

Moreover, techniques are known in the art for using sensorless pump conversion to obtain system pressure and flow based upon motor readouts signals. However, known sensorless models presented so far are formulated in either a 1D space or a 2D discrete space, which makes it a difficult to obtain the system pressure and flow rate from motor speed and power in terms of algorithms development and signals conversion accuracy.

Several know approaches may be used for the sensorless conversion, including discrete models calibrated with pump and system hydronic data together with numerical solutions. Such discrete sensorless modeling approaches are simple and straightforward. The conversion accuracy may be preserved well within a less than 5-10% margin of error. On the other hand, there are some theoretical approaches as well based upon pump and system characteristics equations for some simple and easy pump control applications where there is no accurate flow and pressure for pump control requested and there is no calibration sensors provided. As a tradeoff, the flow and pressure conversion accuracy may have as low as a greater than 10-15% margin of error. However, the conversion accuracy may be deteriorated very rapidly at low speeds.

SUMMARY OF THE INVENTION

In summary, the present invention provides a 3D sensorless means and converter developed to obtain system flow and pressure for a dynamic hydronic pumping system with respect to motor signals based on pump and motor calibration data. The system pressure and flow may be resolved directly in a 3 dimensional formulation from any pair of motor readout signals, such as speed, current, torque, power, and so forth.

By way of example, and according to some embodiments, the present invention may take the form of apparatus, such as a pump controller, featuring a signal processor configured at least to:
- receive signaling containing information about calibrated motor speed and power data for a hydronic pumping system, and
- determine system pumping flow rate and pressure associated with an equivalent hydronic system characteristic variable using a 3-dimensional sensorless model or algorithm, based at least partly on the signaling received.

Embodiments of the present invention may also include one or more of the following features:

The signal processor may be configured to provide a corresponding signal containing information about the system pumping flow rate and pressure associated with the equivalent hydronic system characteristic variable determined.

The corresponding signaling may contain information used to control the hydronic pumping system.

The signal processor or processing module may be configured to determine the system pumping flow rate and pressure using the 3-dimensional sensorless model or algorithm, based at least partly on processing the signaling related to the calibrated motor speed and power data.

The signal processor or processing module may be configured to implement the 3-dimensional sensorless model or algorithm based at least partly on processing signaling related to a power conversion relationship between hydronic, mechanical and electrical parameters from a pump to a motor or drive in the hydronic pumping system.

The signal processor or processing module may be configured to implement the 3-dimensional sensorless model or algorithm may be based at least partly on some combination of the following steps:

Processing signaling related to the equation no. 1:

$$\gamma(P,Q,W,n,C_v)=0 \tag{1},$$

where $\gamma$ presents the power conversion relationship between hydronic, mechanical and electrical from pump to motor drive;

Processing, decoupling and remapping signaling related to an energy conversion function of the aforementioned equation no. 1 taken to directly formulate a corresponding system flow rate, system pressure or pump differential pressure, motor power functions with respect to motor speed and equivalent system characteristics;

Processing signaling related to reconstructed 3D functions represented and resolved to yield the pump flow rate and pressure associated with unknown system characteristics at a given motor speed and power, and based at least partly on measured pump and motor calibration data;

Processing signaling related to corresponding 3D reconstructed distribution functions of motor power, pump flow rate and pump differential pressure with respect to motor power and speed represented by equation nos. 2.1, 2.2. and 2.3, as follows:

$$w(W,n,C_v)=0, \tag{2.1}$$

$$g(Q,n,C_v)=0, \tag{2.2}$$

and $$p(P,n,C_v)=0. \tag{2.3},$$

where w, g and p are functions of the motor power of W, the system flow rate of Q and the pump differential pressure of P with respect to the motor speed of n and the equivalent system characteristic variable of $C_v$;

Processing signaling related to 3D discrete decoupled and remapped distribution functions of system flow, pump differential pressure, motor power with respect to motor speed and the equivalent system characteristics obtained from a pumping system;

Processing and obtaining, for a pair of given W and n motor readouts at an instant time, signaling related to unknown equivalent system characteristics variable of $C_v$ in the aforementioned equation no. 2.1;

Processing and obtaining signaling related to the pump differential pressure of P and flow rate of Q directly from equation nos. 3.1 and 3.2, as follows:

$$g(Q,n,\hat{w}(W,n))=0, \tag{3.1}$$

and $$p(P,n,\hat{w}(W,n))=0. \tag{3.2},$$

where $\hat{w}$ is an inversely remapped power function of w; and

Processing and obtaining signaling related to the pump differential pressure of P and flow rate of Q directly with a given pair of the motor power of W and the motor speed of n for the hydronic system of $C_v$.

The apparatus may further include at least one memory including computer program code; and the at least one memory and computer program code are configured to, with at least one processor, cause the apparatus at least to:
  receive the signaling; and
  determine the system pumping flow rate and pressure associated with the equivalent hydronic system characteristic variable using a 3-dimensional sensorless model or algorithm, based at least partly on the signaling received.

The apparatus may include, or take the form of, a pump control or controller, including a PID control, having the signal processor or signal processor module.

According to some embodiments, the present invention may takes the form of a method including steps for receiving in the signal processor signaling containing information about the calibrated motor speed and power data for the hydronic pumping system, and determining in the signal processor the pumping flow rate and pressure associated with an equivalent hydronic system characteristic variable using the 3-dimensional sensorless model or algorithm, based at least partly on the signaling received.

The present invention may also, e. g., take the form of a computer program product having a computer readable medium with a computer executable code embedded therein for implementing the method, e.g., when run on a signaling processing device that forms part of such a pump controller. By way of example, the computer program product may, e. g., take the form of a CD, a floppy disk, a memory stick, a memory card, as well as other types or kind of memory devices that may store such a computer executable code on such a computer readable medium either now known or later developed in the future.

BRIEF DESCRIPTION OF THE DRAWING

The drawing includes the following Figures, which are not necessarily drawn to scale:

FIG. 1 includes FIGS. 1a, 1b and 1c, where FIG. 1a is a diagram of a secondary variable speed pump control hydronic heating or cooling system that is known in the art; where FIG. 1b is a diagram of a water booster pumping system that is known in the art; and FIG. 1c is a graph of flow (GPM) in relation to foot head pressure for implementing an adaptive control technique based on an adaptive control curve in which the hydronic power saved=dP*Q* at a flow rate of Q*, consistent with that known in the art.

FIG. 2 is a block diagram of apparatus having a signal processor configured for implementing the signal processing functionality, according to some embodiments of the present invention.

FIG. 3 is a model of a conversion of system pressure and flow rate and motor electrical power and speed for a hydronic pumping system like that shown in FIG. 1b.

FIG. 4 is a graph of flow rate, Q (gpm) versus pressure P (Ft or psi) having a pump differential pressure curve at a given speed balanced with system characteristics curve at an equilibrium point.

FIG. 5 includes FIGS. 5a, 5b and 5c, showing 3D discrete distribution functions of system flow, pump differential pressure, motor power with respect to motor speed and equivalent system characteristics, respectively.

FIG. 6 is a graph of flow rate (gpm) versus differential pressure (psi) showing a comparison of pump differential pressure and flow rate readouts from a converter (dashed lines) and sensors (solid lines) with respect to motor speed.

DETAILED DESCRIPTION OF THE INVENTION

3D Discrete Sensorless Conversion

The present invention provides a new and unique 3D discrete sensorless conversion means or technique developed to obtain the system flow and pressure for a dynamic hydronic pumping system with respect to motor signals based on pump and motor calibration data. The system pressure and flow can be resolved directly and more accurately from any pair of motor readout signals, such as speed, current, torque, power, and so forth.

By way of example, FIG. 2 shows apparatus generally indicated as 10 according to some embodiments of the present invention that includes a signal processor or signal processing module 12 in combination with other signal processor circuits and components 14. The signal processor 12 may be configured to implement the signal processing functionality according to some embodiments of the present invention.

In operation, the signal processor 12 may be configured at least to:
  receive signaling containing information about calibrated motor speed and power data for a hydronic pumping system, and
  determine system pumping flow rate and pressure associated with an equivalent hydronic system characteristic variable using a 3-dimensional sensorless model or algorithm, based at least partly on the signaling received.

By way of example, the signaling may be received from a stored database, e.g., that forms part of a memory module. The calibrated motor speed and power data may be determined by processing associated signaling received from a particular motor, e.g., during testing in the field and being received from a particular centrifugal pump to be controlled like that shown in FIG. 1b. Alternatively, the calibrated motor speed and power data may be determined by processing associated signaling received from a representative motor in a series or class of pumps, e.g., tested by the manufacturer at the factory or manufacturing plant and forming part of or integrated into a motor purchased, e.g., being stored in a memory module in the motor, the pump, or the pump controller. The scope of the invention is not intended to be limited to how the calibrated motor speed and power data is determined, or whether the calibrated motor speed and power data is particular to a given motor or a class or series of motors, etc.

The signal processor 12 may also be configured to provide corresponding signaling containing information about the system pumping flow rate and pressure determined, e.g., in order to control one or more of the pumps shown in FIG. 1a, or the centrifugal pump shown in FIG. 1b.

By way of further example, the apparatus 10 may take the form of, or form part of, the pump controller shown in FIG. 1a, or the controller shown in FIG. 1b. The scope of the invention is intended to include, and embodiments are envisioned in which, the apparatus 10 takes the form of, or includes one or more components, e.g., of the hydronic pumping system shown in FIGS. 1a and 1b.

The signal processor or processing module may be configured to implement the 3-dimensional sensorless model or algorithm and the signal processing associated therewith for implementing the present invention, e.g., consistent with that shown in FIG. 2, based at least partly on that set forth below, as follows:

FIG. 3 shows schematically a model of energy conversion between system pressure or pump differential pressure and the flow rate of P and Q associated with equivalent hydronic system characteristics variable of $C_v$ at a discharge section of a pump and motor power and speed of W and n at the other end of a motor drive at any time.

FIG. 4 shows pump and system hydronic characteristics with respect to the motor speed and power W, which demonstrates schematically pump differential pressure curves at a given speed and power intersected or balanced with the system characteristics curve at an equilibrium point. The corresponding mathematic expression can be presented as in equation no. 1, as follows:

$$\gamma(P,Q,W,n,C_v)=0, \qquad (1)$$

where $\gamma$ presents a power conversion relationship between hydronic, mechanical and electrical from pump to motor drive, which may be complicated in nature to some since the motor and pump efficiency varies with respect to motor speed, system pressure and flow rate.

According to some embodiments of the present invention, a 3D distribution approach by decoupling and remapping the energy conversion function of equation no. 1 may be taken to directly formulate the corresponding system flow rate, system pressure or pump differential pressure, motor power functions with respect to motor speed and equivalent system characteristics. The reconstructed 3D functions represented may then be resolved to yield the pump flow rate and pressure associated with any unknown system characteristics at a given motor speed and power, based at least partly on the measured pump and motor calibration data. The corresponding 3D reconstructed distribution functions of motor power, pump flow rate as well as pump differential pressure with respect to motor power and speed may be represented by equation nos. 2.1, 2.2. and 2.3 accordingly, as follows:

$$w(W,n,C_v)=0, \qquad (2.1),$$

$$g(Q,n,C_v)=0, \qquad (2.2)$$

and $$p(P,n,C_v)=0. \qquad (2.3),$$

where w, g and p are functions of the motor power of W, the system flow rate of Q and the pump differential pressure of P with respect to the motor speed of n and the equivalent system characteristic variable of $C_v$. The 3D discrete decoupled and remapped distribution functions of system flow, pump differential pressure, motor power with respect to motor speed and the equivalent system characteristics obtained from a real pumping system are shown in 3D distribution functions in FIG. 5, respectively.

For a pair of given W and n motor readouts at an instant time, the unknown equivalent system characteristics variable of $C_v$ in equation no. 2.1 can be obtained numerically. The pump differential pressure of P and flow rate of Q can then be obtained directly from equation nos. 3.1 and 3.2 as follows:

$$g(Q,n,\hat{w}(W,n))=0, \quad (3.1)$$

and $$p(P,n,\hat{w}(W,n))=0. \quad (3.2),$$

where $\hat{w}$ is an inversely remapped power function of w. The pump differential pressure of P and flow rate of Q can then be obtained directly with a given pair of the motor power of W and the motor speed of n for the hydronic system of $C_v$.

The 3D sensorless converter for pump differential pressure and flow rate according to some embodiments of the present invention has been developed and tested in a closed loop hydronic system. FIG. 6 shows a comparison of the pump differential pressure and flow rate readouts plotted correspondingly from the converter (dashed lines) and sensors (solid lines) with respect to motor speed correspondingly.

Calibration with Instrumentation

The pump differential pressure data in equation no. 3 may be used for a closed loop system since all energy consumed by the system is from the contribution of system dynamic friction loss which is only relevant to pump differential pressure. By way of example, a differential pressure sensor or a pressure sensor together with a flow sensor may be used to collect the pumping system calibration data.

For an open loop system with a static suction pressure, the system pressure data calibrated in the field may be utilized directly. For an open loop system with varying suction pressures, a pressure sensor at the pump suction side or a differential pressure sensor at the pump may be used to calibrate the pressure and flow rate contributions from the suction pressure.

The Apparatus 10

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element 12. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the processors 12 as stand-alone processor or processor module, as separate processor or processor modules, as well as some combination thereof.

The apparatus may also include other signal processor circuits or components 14, e.g. including random access memory (RAM) and/or read only memory (ROM) like element 14, input/output devices and control, and data and address buses connecting the same, and/or at least one input processor and at least one output processor.

Possible Additional Applications/Embodiments

According to the present invention, embodiment are envisioned, and the scope of the invention is intended to include, apparatus, e.g., taking the form of a 3D sensorless conversion means and apparatus for pump differential pressure and flow, including one or more of the following:

A 3D numerical sensorless converter, e.g., which yields the system flow rate and pump differential pressure associated with unknown systems with respect to motor speed and power readout signals based on the pump and motor calibration data. The system pressure and flow can be resolved directly and more accurately from any pair of motor readout signals, such as speed, current, torque, power, and so forth.

Several relevant 3D functions, e.g., of the motor power, the pump differential pressure and flow rate as represented in Eqs. 2 and 3, and graphically represented in FIG. 5.

Any or all potential 3D discrete numerical remapping methods, e.g., such as 2D interpolations, 2D Splines, and so forth.

Any or all potential 2D or 3D discrete or numerical inversion methods, e.g., such as 1D or 2D direct inversion, minimizations, simplex, and so forth.

Any or all close loop or open loop hydronic pumping systems, e.g., such as primary pumping systems, secondary pumping systems, water circulating systems, and pressure booster systems. The systems mentioned herein may consist of a single zone or multiple zones.

Regarding the pump calibration data, e.g., for a close loop hydronic system in such apparatus, the pump differential pressure and flow rate data since all energy consumed by the system is from the contribution of system dynamic friction loss, which is only relevant to the pump differential pressure. The calibration data may include the system pressure data or pump discharge section pressure and the corresponding flow rate.

Regarding the pump calibration data, e.g., for an open loop hydronic system in such apparatus, the pump differential pressure or system pressure and flow rate with respect to the corresponding motor data. For an open loop system with a static suction pressure, the system pressure data and flow rate may be obtained directly in the field. For an open loop system with a varying suction pressure, however, one pressure sensor at the pump suction side or a differential pressure sensor at the pump may be used to calibrate the pressure and flow rate contributions from the suction pressure.

Regarding the measured motor data for such apparatus, e.g., any pair of potential motor electrical or mechanical readout signals such as motor speed, current, torque, power, and so forth may be included.

Regarding the hydronic signals for such apparatus, e.g., system pressure, pump differential pressure, zone pressures, system flow rates, zone flow rates, and so forth may be included.

Regarding control signals transmitting and wiring technologies, e.g., all conventional sensing and transmitting means that are used currently. Preferably, wireless sensor signal transmission technologies would be optimal and favorable.

Regarding the pumps aforementioned for the hydronic pumping systems, e.g., a single pump, a circulator, a group of parallel ganged pumps or circulators, a group of serial ganged pumps or circulators, or their combinations may be included.

Regarding systems flow regulation, e.g., manual or automatic control valves, manual or automatic control circulators, or their combinations may be included.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
    a signal processor or processing module configured at least to:
        receive signaling containing information about calibrated motor speed and power data for one or more pumps in a hydronic pumping system; and
        provide corresponding signaling containing information to control the one or more pumps in the hydronic pumping system, by determining system pumping flow rate and pressure based upon 3-dimensional discrete distribution functions of pump differential pressure, system flow rate and motor power with respect to motor speed and at least one equivalent hydronic system characteristic variable of an instant system curve $C_v$ using a 3-dimensional sensorless model or algorithm and the signaling received;
    the signal processor or processing module being configured to implement the 3-dimensional sensorless model or algorithm based at least partly on processing signaling related to equation no. 1, as follows:

$$\gamma(P,Q,W,n,C_v)=0, \quad (1)$$

where $\gamma$ presents a power conversion relationship between hydronic, mechanical and electrical from pump to motor drive that is a function of pump differential pressure P; system flow rate Q; motor power W; motor speed n; and the equivalent system characteristic variable of the instant curve $C_v$.

2. Apparatus according to claim 1, wherein the signal processor or processing module is configured to provide the corresponding signaling as control signaling.

3. Apparatus according to claim 1, wherein the signal processor or processing module is configured to determine the system pumping flow rate and pressure using the 3-dimensional sensorless model or algorithm, based at least partly on processing the signaling related to the calibrated motor speed and power data.

4. Apparatus according to claim 3, wherein the signal processor or processing module is configured to implement the 3-dimensional sensorless model or algorithm based at least partly on processing signaling related to a power conversion relationship between hydronic, mechanical and electrical parameters from a pump to a motor or drive in the hydronic pumping system.

5. Apparatus according to claim 1, wherein the at least one equivalent hydronic system characteristic variable includes an equivalent hydronic system characteristic variable for flow rate Q of the hydronic pumping system.

6. Apparatus according to claim 1, wherein the at least one equivalent hydronic system characteristic variable includes an equivalent hydronic system characteristic variable for pumping pressure P of the hydronic pumping system.

7. Apparatus according to claim 2, wherein the signal processor or processing module is configured to
    determine the 3-dimensional sensorless model or algorithm based upon equation nos. 2.1, 2.2 and 2.3, as follows:

$$w(W,n,C_v)=0, \quad (2.1),$$

$$g(Q,n,C_v)=0 \quad (2.2)$$

and $$p(P,n,C_v)=0, \quad (2.3); \text{ and}$$

determine an unknown hydronic system characteristic variable of $C_v$ for a pair of calibrated motor speed and power data at an instant of time based upon a motor power function defined as: $w(W,n,C_v)=0$; and
    determine the system pumping flow rate and pressure using based upon equation nos. 3.1 and 3.2 for system flow rate and pump differential pressure functions defined as:

$$g(Q,n,\hat{w}(W,n))=0, \quad (3.1)$$

and $$p(P,n,\hat{w}(W,n))=0, \quad (3.2),$$

where w, g and p are 3D functions of motor power of W, system flow rate of Q and the pump differential pressure of P with respect to the motor speed of n and the equivalent system characteristic variable of $C_v$, and where $\hat{w}$ is an inversely remapped power function of w.

8. Apparatus according to claim 2, wherein
    the apparatus comprises a secondary variable speed pump control hydronic heating and cooling system having the one or more pumps arranged in a process pipe coupled to heaters and coolers; and
    the one or more pumps are configured to respond to the control signaling and pump fluid to the heaters and coolers to operate the secondary variable speed pump control hydronic heating and cooling system.

9. Apparatus according to claim 2, wherein
    the apparatus comprises a water booster pumping system having the one or more pumps arranged in a process pipe; and
    the one or more pumps are configured to respond to the control signaling and pump a fluid flow in the process pipe to operate the water booster pumping system.

10. Apparatus according to claim 2, wherein
    the apparatus comprises the hydronic pumping system having the one or more pumps arranged in a process pipe; and
    the one or more pumps are configured to respond to the control signaling and pump a fluid flow in the process pipe to operate the hydronic pumping system.

11. Apparatus comprising:
    a signal processor or processing module configured at least to:
        receive signaling containing information about calibrated motor speed and power data for one or more pumps in a hydronic pumping system; and
        provide corresponding signaling containing information to control the one or more pumps in the hydronic pumping system, by determining system pumping flow rate and pressure based upon 3-dimensional discrete distribution functions of pump differential pressure, system flow rate and motor power with respect to motor speed and at least one equivalent hydronic system characteristic variable of an instant system curve $C_v$ using a 3-dimensional sensorless model or algorithm and the signaling received;

the signal processor or processing module being configured to determine the system pumping flow rate and pressure using the 3-dimensional sensorless model or algorithm, based at least partly on processing the signaling related to the calibrated motor speed and power data;

the signal processor or processing module being configured to implement the 3-dimensional sensorless model or algorithm based at least partly on processing signaling related to a power conversion relationship between hydronic, mechanical and electrical parameters from a pump to a motor or drive in the hydronic pumping system; and the signal processor or processing module being configured to implement the 3-dimensional sensorless model or algorithm based at least partly on processing signaling related to equation no. 1, as follows:

$$\gamma(P,Q,W,n,C_v)=0, \quad (1)$$

where $\gamma$ presents the power conversion relationship between hydronic, mechanical and electrical from pump to motor drive that is a function of pump differential pressure P; system flow rate Q; motor power W; motor speed n; and the equivalent system characteristic variable of the instant curve $C_v$.

12. Apparatus according to claim 11, wherein the signal processor or processing module is configured to implement the 3-dimensional sensorless model or algorithm based at least partly on processing, decoupling and remapping signaling related to an energy conversion function of equation no. 1 taken to directly formulate a corresponding system flow rate, system pressure or pump differential pressure, motor power functions with respect to motor speed and equivalent system characteristics.

13. Apparatus according to claim 12, wherein the signal processor or processing module is configured to implement the 3-dimensional sensorless model or algorithm based at least partly on processing signaling related to reconstructed 3D functions represented and resolved to yield the pump flow rate and pressure associated with unknown system characteristics at a given motor speed and power, and based at least partly on measured pump and motor calibration data.

14. Apparatus according to claim 13, wherein the signal processor or processing module is configured to implement the 3-dimensional sensorless model or algorithm based at least partly on processing signaling related to corresponding 3D reconstructed distribution functions of motor power, pump flow rate and pump differential pressure with respect to motor power and speed represented by equation nos. 2.1, 2.2, and 2.3, as follows:

$$w(W,n,C_v)=0, \quad (2.1),$$

$$g(Q,n,C_v)=0, \quad (2.2)$$

and $$p(P,n,C_v)=0, \quad (2.3),$$

where w, g and p are functions of the motor power of W, the system flow rate of Q and the pump differential pressure of P with respect to the motor speed of n and the equivalent system characteristic variable of $C_v$.

15. Apparatus according to claim 14, wherein the signal processor or processing module is configured to implement the 3-dimensional sensorless model or algorithm based at least partly on processing signaling related to 3D discrete decoupled and remapped distribution functions of system flow, pump differential pressure, motor power with respect to motor speed and the equivalent system characteristics obtained from a pumping system.

16. Apparatus according to claim 15, wherein the signal processor or processing module is configured to implement the 3-dimensional sensorless model or algorithm based at least partly on processing and obtaining, for a pair of given W and n motor readouts at an instant time, signaling related to unknown equivalent system characteristics variable of $C_v$ in equation no. 2.1.

17. Apparatus according to claim 16, wherein the signal processor or processing module is configured to implement the 3-dimensional sensorless model or algorithm based at least partly on processing and obtaining signaling related to the pump differential pressure of P and flow rate of Q directly from equation nos. 3.1 and 3.2, as follows:

$$g(Q,n,\hat{w}(W,n))=0, \quad (3.1)$$

and $$p(P,n,\hat{w}(W,n))=0, \quad (3.2),$$

where $\hat{w}$ is an inversely remapped power function of w.

18. Apparatus according to claim 17, wherein the signal processor or processing module is configured to implement the 3-dimensional sensorless model or algorithm based at least partly on processing and obtaining signaling related to the pump differential pressure of P and flow rate of Q directly with a given pair of the motor power of W and the motor speed of n for the hydronic system of $C_v$.

19. Apparatus according to claim 16, wherein the apparatus comprises the hydronic pumping system having a controller with the signal processor or processing module configured therein.

20. A hydronic pumping system comprising:
one or more pumps arranged in the process pipe; and
a controller having a signal processor or processing module configured at least to:
receive signaling containing information about calibrated motor speed and power data for the one or more pumps;
provide controller signaling containing information to control the one or more pumps, by determining system pumping flow rate and pressure based upon 3-dimensional discrete distribution functions of pump differential pressure, system flow rate and motor power with respect to motor speed and at least one equivalent hydronic system characteristic variable of an instant system curve $C_v$ using a 3-dimensional sensorless model or algorithm and the signaling received;

the signal processor or processing module being configured to implement the 3-dimensional sensorless model or algorithm based at least partly on processing signaling related to equation no. 1, as follows:

$$\gamma(P,Q,W,n,C_v)=0, \quad (1)$$

where $\gamma$ presents the power conversion relationship between hydronic, mechanical and electrical from pump to motor drive that is a function of pump differential pressure P;

system flow rate Q; motor power W; motor speed n; and the equivalent system characteristic variable of the instant curve $C_v$.

21. A hydronic pumping system according to claim 20, wherein the signal processor or processing module is configured to determine the 3-dimensional sensorless model or algorithm based upon equation nos. 2.1, 2.2 and 2.3, as follows:

$$w(W,n,C_v)=0, \quad (2.1),$$

$$g(Q,n,C_v)=0, \quad (2.2)$$

and $$p(P,n,C_v)=0, \quad (2.3);$$

and determine an unknown hydronic system characteristic variable of $C_v$ for a pair of calibrated motor speed and power data at an instant of time based upon a motor power function defined as: $w(W,n,C_v)=0$; and determine the system pumping flow rate and pressure using equation nos. 3.1 and 3.2 based upon system flow rate and pump differential pressure functions defined as follows:

$$g(Q,n,\hat{w}(W,n))=0, \quad (3.1)$$

and $$p(P,n,\hat{w}(W,n))=0, \quad (3.2),$$

where w, g and p are 3D functions of motor power of W, system flow rate of Q and the pump differential pressure of P with respect to the motor speed of n and the equivalent system characteristic variable of $C_v$, and where $\hat{w}$ is an inversely remapped power function of w.

22. A hydronic pumping system according to claim 20, wherein the at least one equivalent hydronic system characteristic variable includes equivalent hydronic system characteristic variables for flow rate Q and pumping pressure P of the hydronic pumping system.

23. A hydronic pumping system according to claim 20, wherein the hydronic pumping system comprises a secondary variable speed pump control hydronic heating and cooling system having the one or more pumps arranged in a process pipe coupled to heaters and coolers; and the one or more pumps are configured to respond to the controller signaling and pump fluid through the process pipe to the heaters and coolers to operate the secondary variable speed pump control hydronic heating and cooling system.

24. A hydronic pumping system according to claim 20, wherein the hydronic pumping system comprises a water booster pumping system having the one or more pumps arranged in a process pipe; and the one or more pumps are configured to respond to the controller signaling and pump a fluid flow in the process pipe to operate the water booster pumping system.

\* \* \* \* \*